(12) United States Patent
Hofmann

(10) Patent No.: US 7,841,546 B2
(45) Date of Patent: Nov. 30, 2010

(54) FLUID DISTRIBUTING APPARATUS FOR A WINDSCREEN OR HEADLAMP WASHER SYSTEM OF A VEHICLE

(75) Inventor: Jürgen Hofmann, Melsungen (DE)

(73) Assignee: Vola Plast Werner Hoppach KG (DE)

( * ) Notice: Subject to any disclaimer, the term of this patent is extended or adjusted under 35 U.S.C. 154(b) by 451 days.

(21) Appl. No.: 12/015,045

(22) Filed: Jan. 16, 2008

(65) Prior Publication Data
US 2008/0169358 A1   Jul. 17, 2008

(30) Foreign Application Priority Data
Jan. 16, 2007   (DE) .................. 10 2007 003 092

(51) Int. Cl.
*B05B 1/10* (2006.01)
*B60S 1/46* (2006.01)
(52) U.S. Cl. .............. 239/284.1; 239/284.2; 239/587.1; 239/600; 15/250.01; 15/250.002
(58) Field of Classification Search ............. 239/284.1, 239/284.2, 587.1, 600; 15/250.01–250.08, 15/250.001–250.003; *B60S 1/56, 1/52, 1/60*
See application file for complete search history.

(56) References Cited

FOREIGN PATENT DOCUMENTS

| DE | 4305245 A1 | 8/1994 |
|---|---|---|
| DE | 19641460 A1 | 4/1998 |
| DE | 19746059 A1 | 4/1999 |
| DE | 102004016991 A1 | 11/2005 |
| DE | 102004018607 A1 | 11/2005 |
| FR | 2677938 A1 | 6/1991 |
| WO | 2005100108 | 10/2005 |

OTHER PUBLICATIONS

European Patent Office, German Language European Search Report issued in connection with European application No. EP 08000641, on Oct. 29, 2009, 2 pages.

*Primary Examiner*—Dinh Q Nguyen
(74) *Attorney, Agent, or Firm*—Hanley, Flight & Zimmerman, LLC

(57) ABSTRACT

The invention relates to a fluid distributing apparatus for a windscreen or head lamp washer system of a vehicle, including a body (102, 202, 302) for fluid distribution, a holding apparatus (110, 210, 310) for attaching said fluid distributing apparatus to the vehicle and at least one connecting tubing (104, 206, 208, 308) for connecting a fluid line, said body (102, 202, 302) being retained for pivotal movement with respect to said holding apparatus (110, 210, 310), an adjusting apparatus being attached to said body (102, 202) or to said connecting tubing (308) for pivotal movement of said body (102, 202, 302) with respect to said holding apparatus (110, 210, 310) and for retaining said body (102, 202, 302) in the desired position with respect to said holding apparatus (110, 210, 310), said adjusting apparatus being configured to be a set screw (112, 212, 312), a tubular retaining fixture (132, 332) having an internal thread being attached to said body (102, 202) or to said connecting tubing (308), said set screw (112, 212, 312) being adapted to be screwed in such a manner into said retaining fixture that one free end of said set screw (112, 212, 312) protrudes from said retaining fixture (132, 332).

9 Claims, 6 Drawing Sheets

FLUID DISTRIBUTING APPARATUS FOR A WINDSCREEN OR HEADLAMP WASHER SYSTEM OF A VEHICLE

CROSS-REFERENCE TO RELATED APPLICATIONS

This application claims Priority from German Application No. DE 10 2007 003 092.6-22 filed on 16. Jan. 2007

FIELD OF THE INVENTION

The present invention relates to a fluid distributing apparatus as set forth in the preamble of claim 1.

In a windscreen or headlamp washer system of a vehicle, water containing cleaning agents and/or antifreeze (referred to as fluid herein after) is pumped through hoses into a fluid distributing apparatus from which it is applied to the windscreen, the rear screen or the headlamps. This fluid distributing apparatus is fastened to the bonnet of the vehicle or in the ventilation grille or beneath the windscreen wipers e.g., using a suited holding apparatus. Beside the holding apparatus, the fluid distributing apparatus also includes a body for distributing fluid and at least one connecting tubing for connecting a fluid line.

DESCRIPTION OF THE PRIOR ART

A windscreen washer system is known from DE 197 46 059 A1 the body of which is pivotally retained in a holding apparatus, an internal thread for receiving a set screw being formed in said holding apparatus. At its free end protruding from the internal thread, said set screw has a spherical head that is embedded in a mating recess provided on the body. The body may be pivoted with respect to the holding apparatus by adjusting the set screw. The body should thereby be set so that the fluid exiting the body hits the windscreen, the rear screen or the headlamp at the desired place in order to achieve the best possible fluid distribution. By fastening the set screw in the recess by means of the spherical head, high friction forces are generated, which make it more difficult to move the set screw and, as a result thereof, to adjust the body. Since the set screw is disposed on a projection, it is difficult to access, this also making it more difficult to adjust the body. Furthermore, it is possible that, when the set screw is tension-biased, the spherical head jumps out of its retaining fixture so that it is no longer possible to make any adjustment as a result thereof.

BRIEF SUMMARY OF THE INVENTION

In view thereof, it is the object of the present invention to provide a fluid distributing apparatus of the type mentioned herein above that allows for easy and precise adjustment of the fluid spray direction.

In accordance with the invention, a fluid distributing apparatus having the features of claim 1 is proposed as a technical solution. Advantageous developed implementations of this fluid distributing apparatus are recited in the dependent claims.

A fluid distributing apparatus implemented in accordance with this teaching offers the advantage that the tubular retaining fixture preferably attached on the body or the connecting tubing retains the set screw directly on the body or on the connecting tubing so that the pivotal forces are transmitted directly and, as a result thereof, readily from the screw to the body or the connecting tubing.

Another advantage is that the end of the set screw, which protrudes from the tubular retaining fixture, abuts an abutment surface attached to the holding apparatus so that here also an easy transmission of the forces onto the holding apparatus is achieved and that the force exerted when rotating the set screw causes, through the thread, the retaining fixture to be displaced and, as a result thereof, the body to pivot so that a continuous and very precise body adjustment is made possible.

Another advantage is that the body adjusted by the set screw is retained in this position by the set screw. The forces acting onto the set screw generate increased friction, inter alia in the threading of the screw and/or on the abutment surface so that the screw is prevented from accidentally moving on its own.

By disposing the set screw directly on the body, a further advantage is obtained: the set screw is easy to access and to adjust.

In another preferred embodiment, a return surface is provided on the holding apparatus for the head of the set screw in particular to abut. This offers the advantage that, when the set screw is being screwed backward, the head of the set screw abuts this return surface, thus causing the connecting tubing and/or the body to pivot in the opposite direction with respect to the holding apparatus so that the body may also be moved in the opposite direction by the set screw. Accordingly, the body can be pivoted in both directions with one single set screw. Here again, the set screw fixes the body in the position set since here also forces are exerted onto the set screw so that accidental rotation of the set screws is prevented.

In a preferred developed implementation, a connecting web for connecting the abutment surface to the return surface is provided between the abutment surface and the return surface of the holding apparatus. This increases the stability of the holding apparatus and undesirable bending of the abutment and/or return surface is thus prevented. At the same time, this makes it possible to reduce the material thickness of the holding apparatus, so that a cost saving is achieved.

In still another preferred embodiment, the set screw is retained with a zero clearance fit between the abutment surface and the return surface. The advantage thereof is that the set screw is prevented from moving and that only the retaining fixture, and as a result thereof, the body are moved upon rotation of the set screw.

In another preferred embodiment of the invention, pins projecting on the left and on the right side of the body are provided for engagement into mating receiving recesses provided on the holding apparatus. The body is retained for pivotal movement in the holding apparatus, more specifically in the receiving recesses of the holding apparatus, so that the body is allowed to pivot with respect to the holding apparatus without much expense of force.

In another preferred embodiment, there are provided two aligned connecting tubings that join together in the region of the body, said body being fastened to the two connecting tubings. The connecting tubings engage into mating receiving recesses in the holding apparatus so that here again the body fastened to the connecting tubing is allowed to pivot with respect to the holding apparatus.

In a preferred developed implementation, it has been found advantageous to design the receiving recesses in such a manner that they are formed to surround more than 180° of the perimeter of the pins and/or of the connecting tubings. As a result, the body is shape-matingly retained on the holding apparatus so that it is prevented from accidentally slipping out of the holding apparatus.

Another advantage of the fluid distributing apparatus is that the body is formed together with the at least one connecting tubing as a single integral first component part and that the holding apparatus is implemented as a second component part. Thanks to this separate manufacturing, the tools necessary for the respective parts are much easier to build, which reduces the manufacturing cost. It is also conceivable to use different materials in order to comply with the respective requirements of use.

Further advantages of the fluid distributing apparatus of the invention will become apparent in the appended drawings and in the following description of embodiments thereof. Likewise, the invention lies in each and every novel feature or combination of features mentioned above or described herein after. The embodiments discussed herein are merely exemplary in nature and are not intended to limit the scope of the invention in any manner.

BRIEF DESCRIPTION OF THE DRAWING

FIG. 1b is a perspective view of the fluid distributing apparatus as shown in FIG. 1a, taken along the section line Ib-Ib in FIG. 1a;

FIG. 1c is a perspective view of the fluid distributing apparatus as shown in FIG. 1a, taken along the section line Ic-Ic in FIG. 1a;

FIG. 1d is a perspective view of the fluid distributing apparatus as shown in FIG. 1a, taken along the section line Id-Id in FIG. 1a;

FIG. 2b is a perspective view of the fluid distributing apparatus as shown in FIG. 2a, taken along the section line IIb-IIb in FIG. 2a;

FIG. 2c is a perspective view of the fluid distributing apparatus as shown in FIG. 2a, taken along the section line IIc-IIc in FIG. 2a;

FIG. 2 is a side view of the fluid distributing apparatus as shown in FIG. 2a, taken along the section line IId-IId in FIG. 2a;

FIG. 3b is a perspective view of the fluid distributing apparatus as shown in FIG. 3a, taken along the section line IIIb-IIIb in FIG. 3a;

FIG. 3c is a perspective view of the fluid distributing apparatus as shown in FIG. 3a, taken along the section line IIIc-IIIc in FIG. 3a;

FIG. 3d is a side view of the fluid distributing apparatus as shown in FIG. 3a, taken along the section line IIId-IIId in FIG. 3a.

DETAILED DESCRIPTION OF THE INVENTION

Figure 1A:
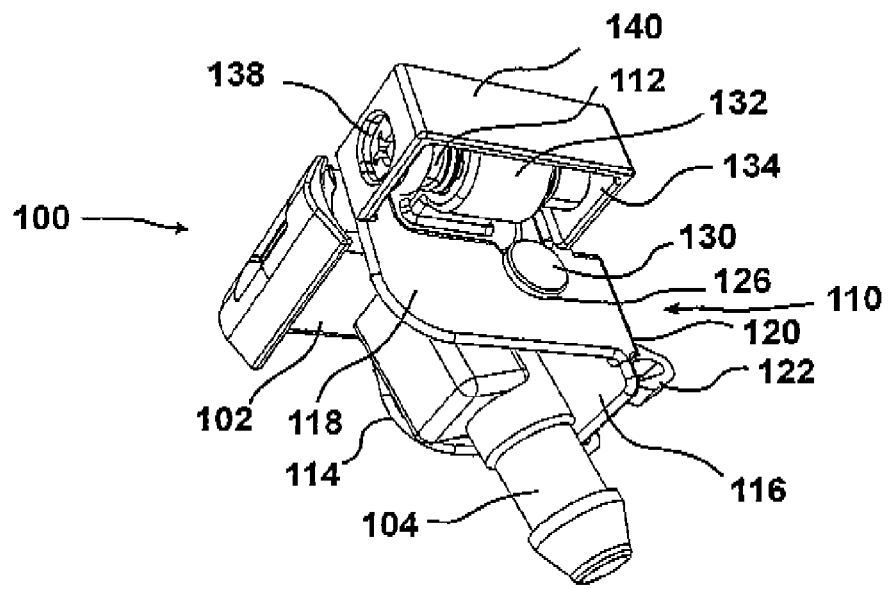
FIG. 1a is a perspective view of a first embodiment of a fluid distributing apparatus of the invention.
Figure 1B:
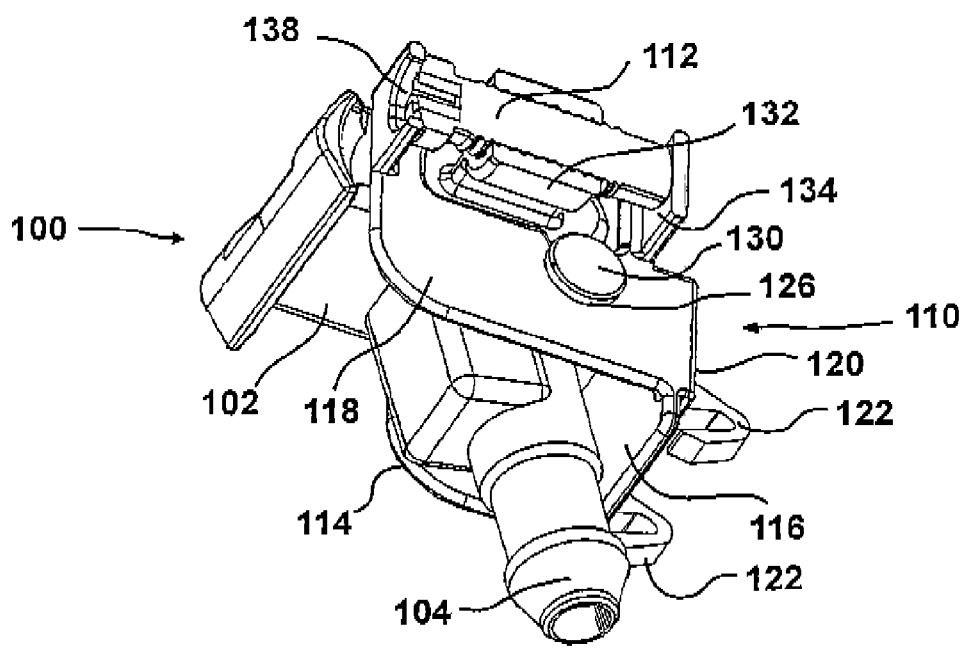
Figure 1C:
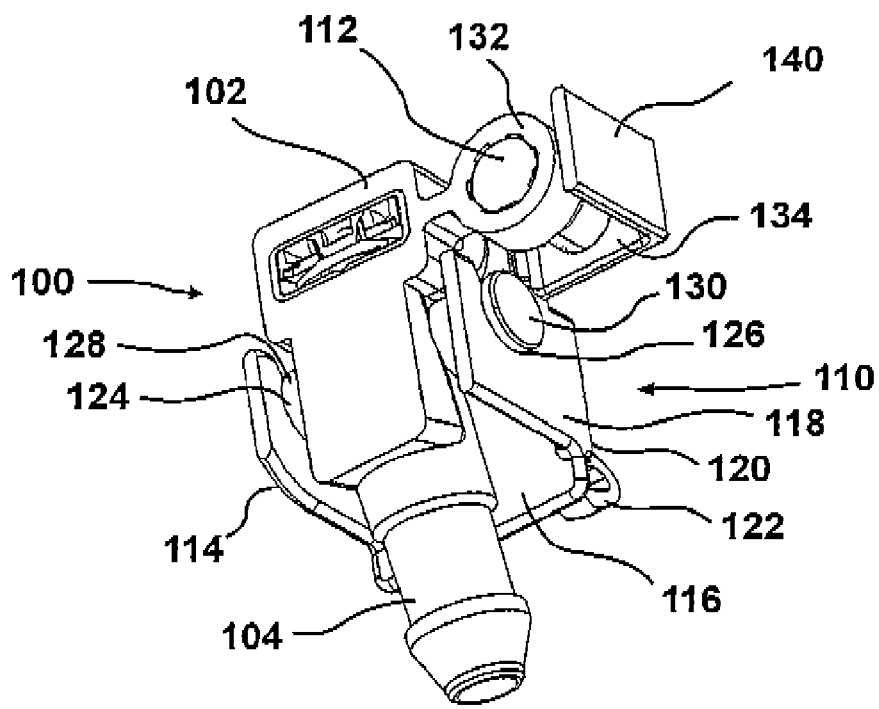
Figure 1D:
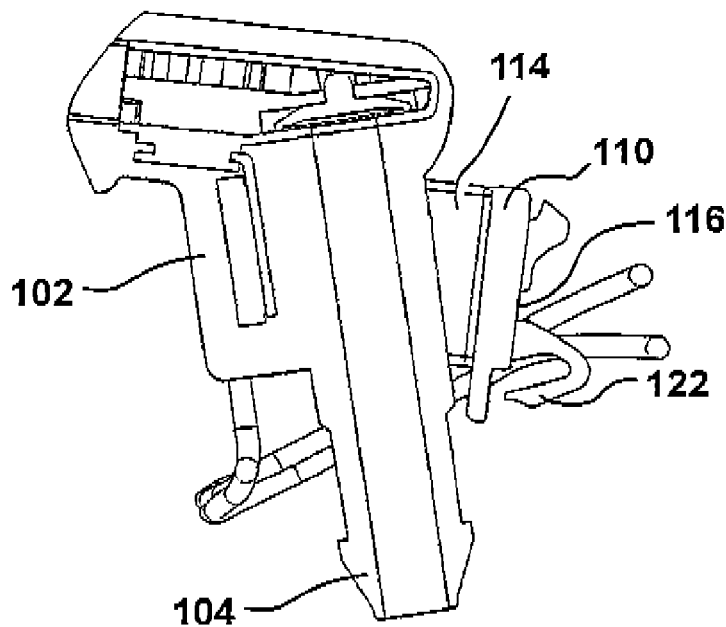

The FIGS. 1a through 1d show a first embodiment of a fluid distributing apparatus 100 of the invention in various views and sectional views. This fluid distributing apparatus is composed of three components. These are first a fluid distributing body 102, which has a connecting tubing 104 formed integrally therewith. Through this connecting tubing 104, fluid is caused to flow from a fluid line that has not been illustrated herein into the body, said fluid being applied to the windscreen, the rear screen or the headlamp of a vehicle by means of a nozzle that has not been illustrated in closer detail herein.

The fluid distributing device 100 further includes a holding apparatus 110 and a set screw 112.

The holding apparatus 110 has a frame 120 comprising three legs 114, 116 and 118, said three legs 114, 116 and 118 being substantially arranged in a U-shaped formation. On the back side of the central leg 116, there are formed two snap elements 122 by means of which the fluid distributing apparatus 100 may for example be clamped to a vehicle bonnet.

In another embodiment that has not been illustrated herein, detent or clamping elements are provided rather than the snap elements for attaching the fluid distributing apparatus 100 to other vehicle parts.

The lateral legs 114 and 118 each comprise a circular receiving recess 124, 126 for engagement of a respective one of the pins 128, 130 projecting from the body 102. The receiving recess 124, 126 surrounds more than 180° of the perimeter of the pin 128, 130 to provide a shape-mating connection between the holding apparatus 110 and the body 102. The connection between the pins 128, 130 and the receiving recess 124, 126 is implemented as a press-fit connection so that it is possible to pivot the body 102 with respect to the holding apparatus 110 but only at the expense of a certain force. This press-fit connection allows for fundamentally maintaining the body 102 in the position set with respect to the holding apparatus 110 as long as no external influences are exerted onto the components.

On one side of the body 102, a tubular retaining fixture 132 is integrally formed as a part thereof, said fixture having an internal thread formed therein. In this retaining fixture 132, there is provided the set screw 112. The retaining fixture 132 is thereby configured to be so short that a free end of the set screw 112 always protrudes from the retaining fixture 132.

On the lateral leg 118 there is formed an abutment surface 134 and a return surface 136 that are oriented perpendicular to the lateral leg 118. The abutment surface 134 projects beyond the set screw 112 for the set screw 112 to abut the abutment surface 134. On the other side, i.e., in the region of the head of the set screw 112, there is located the return surface 136 also for the set screw 112 to abut the return surface 136. An opening 138 is provided in the return surface 136 for accessing the set screw 112 with an appropriate tool for rotation thereof.

The outer side of the abutment surface 134 is connected to the outer side of the return surface 136 via a connecting web 140. A stable construction is thus achieved so that neither the abutment surface 134 nor the return surface 136 will bend inappropriately upon actuation of the set screw 112. The forces acting through the set screw 112 onto the holding apparatus 110 are properly transmitted instead. By interposing the set screw 112 with a zero clearance fit between the abutment surface 134 and the return surface 136, the set screw 112 is prevented from moving so that the force applied upon rotation of the set screw 112 immediately causes the body 102 to pivot.

The procedure of setting the fluid distributing apparatus will be discussed in detail herein after:

Once the fluid distributing apparatus has been attached to the vehicle, the body 102 is for example directed toward the windscreen. For good windscreen washing results, the jet of fluid exiting the body must hit the windscreen at the desired place. For this purpose, the body must be adjusted accordingly. At need, adjustment must be corrected after some time. For this purpose, the operator passes a screwdriver through the opening 138 in the return surface 136 until it enters into the set screw 112. By rotating the set screw 112 clockwise, the set screw 112 moves in the direction of the abutment surface 134. Since the abutment surface 134 cannot swerve aside, rotation of the set screw 112 causes the retaining fixture 132 and, as a result thereof the body 102, to move away from the abutment surface 134. Since the body 102 is retained in the holding apparatus 110 for pivotal movement via the pins 128, 130, the body 102 now pivots about the virtual pin axis so that it changes its position with respect to the windscreen.

Upon counter clockwise rotation of the set screw 112, the retaining fixture 132, and as a result thereof the body 102, move in the opposite direction.

The set screw 112 is dimensioned so as to be disposed with a zero clearance fit between the abutment surface 134 and the return surface 136. Thus, it is ensured that neither the set screw 112 nor the retaining fixture 134 nor the body 102 are caused to move undesirably. Instead, the body 102 is durably retained in the position set.

Figure 2A:
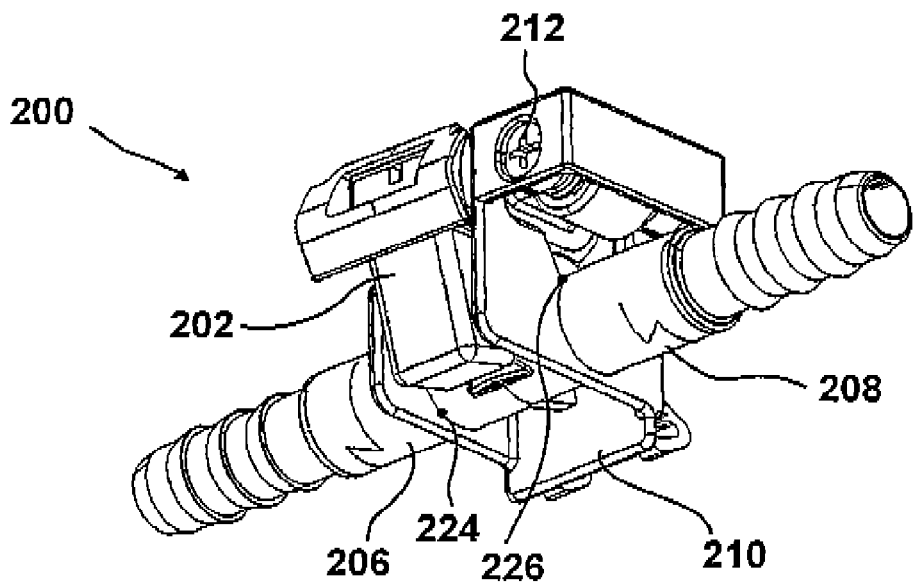
FIG. 2a is a perspective view of a second embodiment of a fluid distributing apparatus of the invention.
Figure 2B:
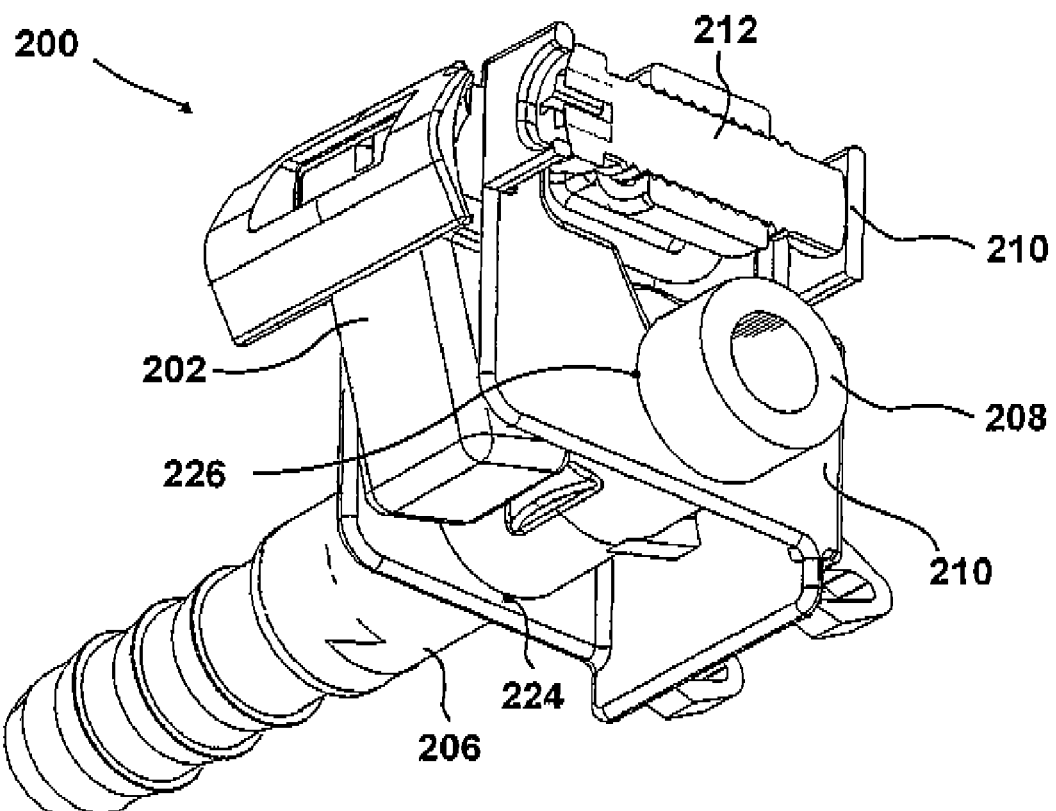
Figure 2C:
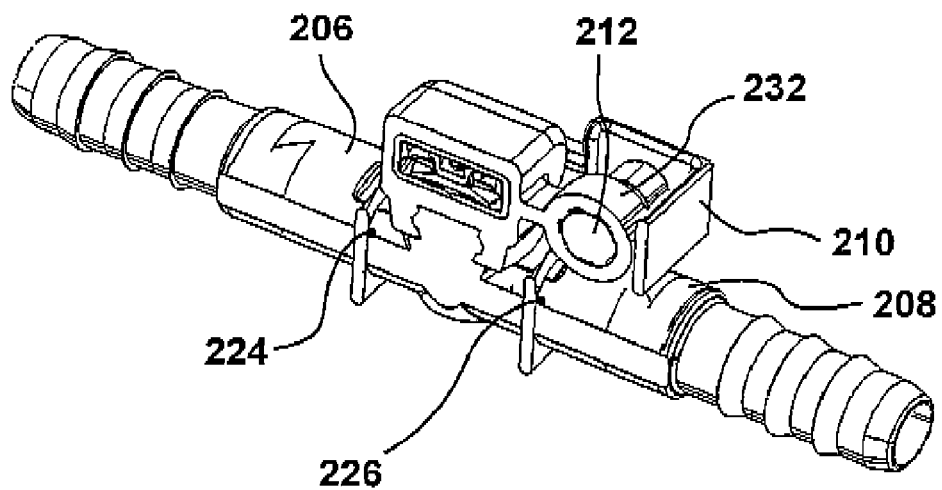
Figure 2D:
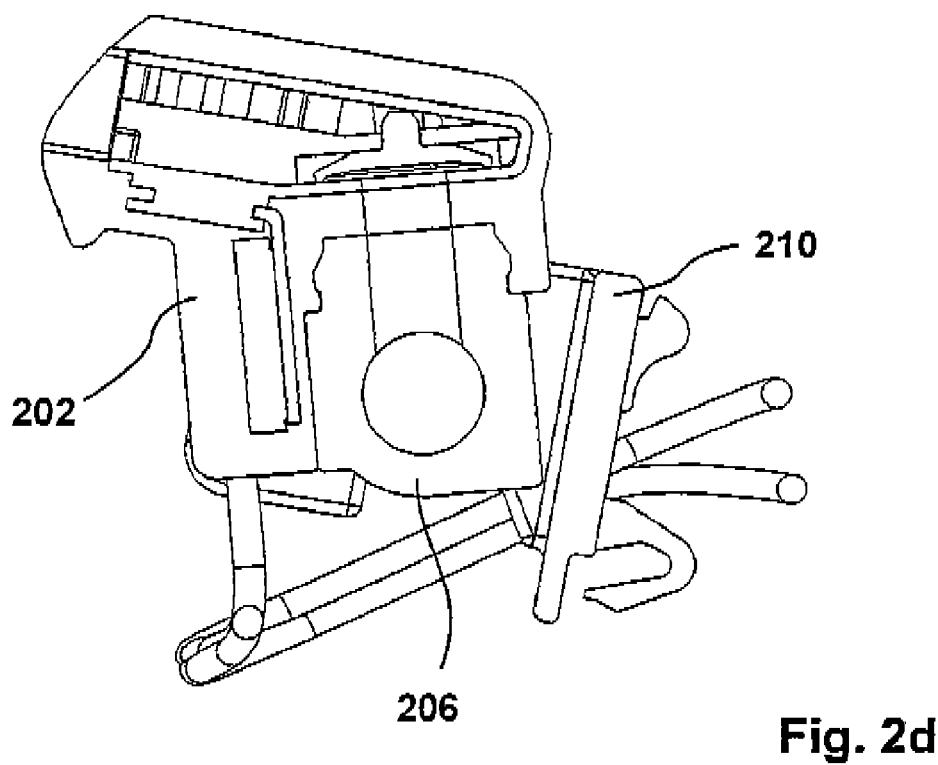

In the second embodiment illustrated in the FIGS. 2a through 2d, the body 202, the set screw 212 and the holding apparatus 210 are substantially configured like in the first embodiment as shown in the FIGS. 1a through 1d. The difference between these two embodiments lies in the connecting tubings. In this second embodiment, there are provided two connecting tubings 206, 208 that are aligned with respect to each other. Both connecting tubings 206, 208 open out into each other and are integrally connected to the body 202. These connecting tubings 206, 208 are substantially circular on their outer side and engage (like the pins 128, 130 of the first embodiment) in mating receiving recesses 224, 226 of the holding apparatus 210. Here also, the connecting tubings 206, 208 are retained in a press-fit relation in the receiving recesses 224, 226. The reader is referred to the description of the first embodiment in this respect.

Figure 3A:
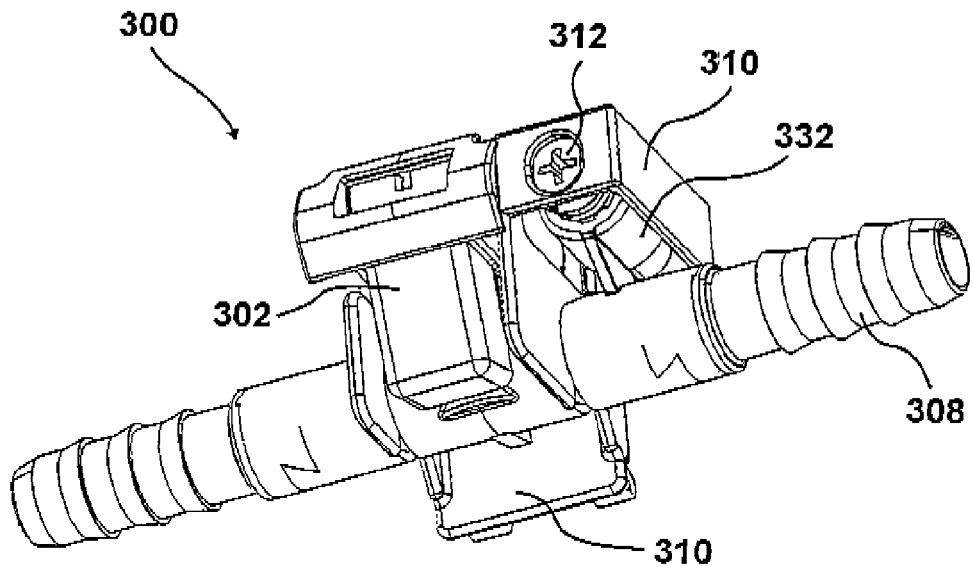
FIG. 3a is a perspective view of a third embodiment of a fluid distributing apparatus of the invention.
Figure 3B:
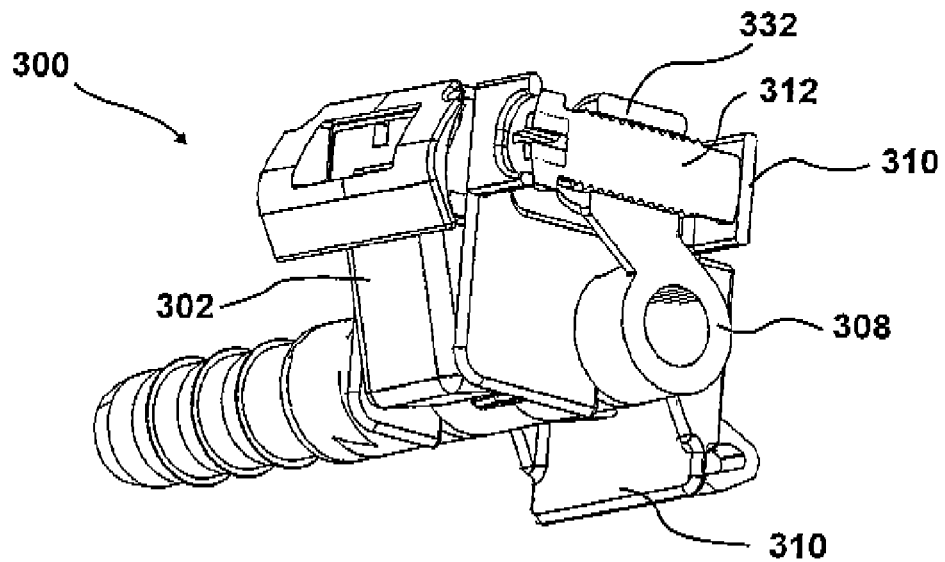
Figure 3C:
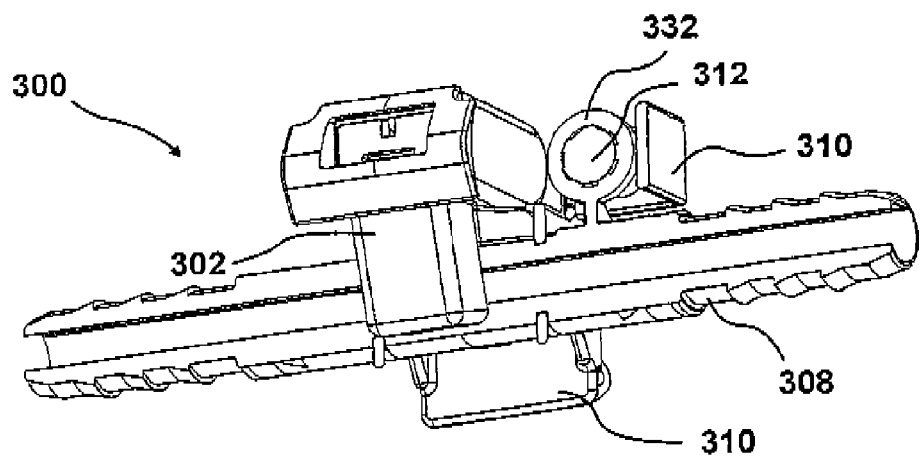
Figure 3D:
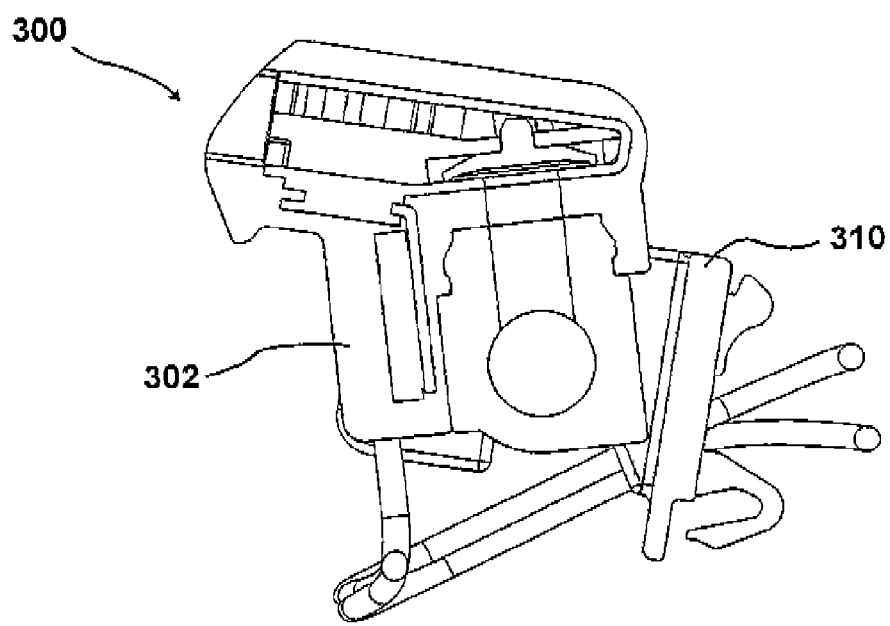

In the third embodiment illustrated in the FIGS. 3a through 3d, the retaining fixture 332 is not integrally attached to the body 302, but to the connecting tubing 308 instead. For the rest, this embodiment corresponds to the second embodiment described in conjunction with the FIGS. 2a through 2d so that the reader is referred to the description By attaching the retaining fixture 332 to the connecting tubing 308, the body 302 is also caused to pivot via the connecting tubing 308 upon actuation of the set screws 312 since the holding apparatus 310 is fixedly mounted to the vehicle.

List of Numerals:

| | |
|---|---|
| 100, 200, 300 | fluid distributing apparatus |
| 102, 202, 302 | body |
| 104 | connecting tubing |
| 206 | connecting tubing |
| 208, 308 | connecting tubing |
| 110, 210, 310 | holding apparatus |
| 112, 212, 312 | set screw |
| 114 | leg |
| 116 | leg |
| 118 | leg |
| 120 | frame |
| 122 | snap elements |
| 124, 224 | receiving recess |
| 126, 226 | receiving recess |
| 128 | pin |
| 130 | pin |
| 132, 332 | retaining fixture |
| 134 | abutment surface |
| 136 | return surface |
| 138 | opening |
| 140 | connecting web |

I claim:

1. A fluid distributing apparatus for a windscreen or head lamp washer system of a vehicle, the apparatus comprising:
    a body for fluid distribution;
    a holding apparatus for attaching the fluid distributing apparatus to the vehicle; and
    at least one connecting tubing for connecting a fluid line,
    wherein the body is pivotally coupled to the holding apparatus,
    wherein an adjusting apparatus is attached to the body or to the connecting tubing for pivotally moving the body with respect to the holding apparatus and for retaining the body in a desired position with respect to the holding apparatus,
    wherein the adjusting apparatus is a set screw,
    wherein a tubular retaining fixture having an internal thread is attached to the body or to the connecting tubing, and
    wherein the set screw is adapted to be screwed into the retaining fixture such that a free end of the set screw protrudes from the retaining fixture.

2. The fluid distributing apparatus as set forth in claim 1, wherein the holding apparatus includes, an abutment surface for engagement with the free end of the set screw of the adjusting apparatus.

3. The fluid distributing apparatus as set forth in claim 1, wherein the holding apparatus includes a return surface for the engagement with a head end of the set screw of the adjusting apparatus.

4. The fluid distributing apparatus as set forth in claim 2, wherein the set screw is retained with a zero clearance fit between the abutment surface and a return surface.

5. The fluid distributing apparatus as set forth in claim 2, wherein the abutment surface and a return surface of the holding apparatus are joined together through a connecting web.

6. The fluid distributing apparatus as set forth in claim 1 further comprising:
    a first projecting pin on a first side of the body;
    a second projecting pin on a second side of the body;
    a first mating receiving recess on the holding apparatus; and
    a second mating receiving recess on the holding apparatus,
    wherein the first projecting pin engages the first mating receiving recess and the second projecting pin engages the second mating receiving recess.

7. The fluid distributing apparatus as set forth in claim 1 further comprising:
    a first connecting tubing;
    a second connecting tubing;
    a first mating receiving recess on the holding apparatus; and
    a second mating receiving recess on the holding apparatus,
    wherein the first connecting tubing and the second connecting tubing are aligned,
    wherein the body is coupled to the first connecting tubing and the second connecting tubing, and
    wherein the first connecting tubing engages the first mating receiving recess and the second connecting tubing engages the second mating receiving recess.

8. The fluid distributing apparatus as set forth in claim 6, wherein the first mating receiving recess and the second mating receiving recess extend at least over 180° of a perimeter of the first projecting pin and the second projecting pin.

9. The fluid distribution apparatus as set forth in claim 7, wherein the first mating receiving recess and the second mating receiving recess extend at least over 180° of a perimeter of the first connecting tubing and the second connecting tubing.

* * * * *